United States Patent
Hesener

(10) Patent No.: US 6,369,351 B1
(45) Date of Patent: Apr. 9, 2002

(54) METHOD FOR PROCESSING AND FOR JOINING, ESPECIALLY, FOR SOLDERING A COMPONENT OR A COMPONENT ARRANGEMENT USING ELECTROMAGNETIC RADIATION

(75) Inventor: Hanno Hesener, Hannover (DE)

(73) Assignee: Patent Treuhand Gesellschaft fur Elektrische Gluhlampen mbH, Munich (DE)

( * ) Notice: Subject to any disclaimer, the term of this patent is extended or adjusted under 35 U.S.C. 154(b) by 0 days.

(21) Appl. No.: 09/529,650
(22) PCT Filed: Aug. 4, 1999
(86) PCT No.: PCT/DE99/02423
  § 371 Date: Apr. 17, 2000
  § 102(e) Date: Apr. 17, 2000
(87) PCT Pub. No.: WO00/12256
  PCT Pub. Date: Mar. 9, 2000

(30) Foreign Application Priority Data

Aug. 28, 1998 (DE) .......................... 198 39 343

(51) Int. Cl.$^7$ ............................ B23K 26/20; B23K 26/36
(52) U.S. Cl. ........................... 219/121.63; 219/121.64; 219/121.72
(58) Field of Search ................ 219/121.67, 121.68, 219/121.69, 121.7, 121.71, 121.72, 121.76, 121.83

(56) References Cited

U.S. PATENT DOCUMENTS 3,935,419 A * 1/1976 Lambert et al. ....... 219/121.67
4,839,497 A   6/1989 Sankar et al.
5,126,532 A * 6/1992 Inagawa et al. ......... 219/121.7
5,272,309 A   12/1993 Goruganthu et al.
5,361,268 A * 11/1994 Fossey et al. .................. 372/23
5,393,957 A * 2/1995 Misawa et al. ........ 219/121.76

FOREIGN PATENT DOCUMENTS

| DE | 40 17 286 | 12/1991 |
| DE | 40 38 765 | 6/1992 |
| DE | 195 29 388 | 1/1996 |
| DE | 195 20 336 | 12/1996 |

* cited by examiner

Primary Examiner—Samuel M. Heinrich
(74) Attorney, Agent, or Firm—Frishauf, Holtz, Goodman, Langer & Chick, P.C.

(57) ABSTRACT

Technique for machining a component or a component array by means of electromagnetic radiation, wherein the component or the component array comprises two materials disposed in succession in the incident direction of the electromagnetic radiation. Electromagnetic radiation of a first wavelength and laser radiation of at least one second wavelength are aimed at the component or the component array. The first and the second wavelengths of the electromagnetic radiation are selected such that the electromagnetic radiation of the first wavelength is absorbed more weakly by a first material of the component or the component array than by a second material disposed downstream of the first material in the incident direction of the electromagnetic radiation, while the electromagnetic radiation of the second wavelength is absorbed more strongly by the first material than by the second material.

32 Claims, 2 Drawing Sheets

METHOD FOR PROCESSING AND FOR JOINING, ESPECIALLY, FOR SOLDERING A COMPONENT OR A COMPONENT ARRANGEMENT USING ELECTROMAGNETIC RADIATION

FIELD OF THE INVENTION

The invention relates to a method for machining a component or a component array by means of electromagnetic radiation, in which the component or the component array comprises at least two materials disposed in succession in the incident direction of the electromagnetic radiation.

BACKGROUND OF THE INVENTION

It is well known to use electromagnetic radiation, in particular laser radiation, for joining components. From German Patent Disclosure DE 195 20 336 A1, a method for soldering electronic components onto a circuit substrate is known, in which laser radiation is employed to heat and melt the solder.

Similar methods are also known from German Patent Disclosures DE 40 17 286 A1, DE 40 38 765 A1, and DE 195 29 388 A1.

It is also known to use laser radiation for soldering components of ceramic material to components of metal. The metal is disposed downstream of the ceramic material in the incident direction, and there is a glass solder between the two materials. The laser radiation is aimed at the ceramic material and is partly absorbed by it and partly passed through to the glass solder, disposed downstream of the ceramic material in the incident direction, and to the metal disposed downstream of the glass solder in the incident direction. The absorption of the laser radiation in the ceramic material and in the metal leads to heating of these materials, and as a result the glass solder is also heated and melts. Once the glass solder has melted in the desired way, the laser radiation can be turned off. In the ensuing solidification of the glass solder, this solder bonds the ceramic material to the metal.

One disadvantage of this known method is that a high intensity of the laser radiation is required in order to assure that a sufficient proportion of the laser radiation will be passed through to the metal so that it can be absorbed by it. This entails a high temperature gradient, which leads to thermal stresses and often to cracking in the ceramic body, which destroys the component. For this reason, the known method has proved to be of only limited utility.

SUMMARY OF THE INVENTION

One object of the invention is to provide an improved technique for machining a component or a component array.

Another object of the invention is to provide a technique for machining a component or a component array with electromagnetic radiation, which technique is also suitable for joining components.

A further object of the invention is to provide a technique for machining a component or a component array with electromagnetic radiation in which damage to the components is reliably avoided.

The fundamental concept of the teaching according to the invention is to employ electromagnetic radiation of different wavelengths for machining components or component arrays that comprise different materials; at least some of the different materials of the component or the component array are assigned electromagnetic radiation of a wavelength that is absorbed more strongly by the affected material than by the other materials. In this way, selective machining of the various materials is made possible, since the electromagnetic radiation assigned to one material acts predominantly or exclusively on that material.

When components of ceramic material are soldered to components of metal, laser radiation of a first wavelength and second wavelength can for instance be used; the first wavelength is absorbed more weakly by the ceramic material than by the metal. In this way, the absorption of the laser radiation of the first wavelength in the ceramic material is reduced, so that on the one hand adequate absorption by the metal and thus adequate heating of the metal is attained. On the other hand, an undesired absorption of laser radiation of this wavelength by the ceramic material is averted. In this way, the risk of cracking from thermal stresses because of an overly high temperature gradient in the ceramic material, and thus the risk of damage to the component, are reliably avoided.

The method of the invention can be performed simply and quickly and in manifold ways. It is especially well-suited to joining components or component arrays of different materials, for instance for soldering, welding or adhesive bonding of them.

The wavelengths of the electromagnetic radiation can be selected within wide limits to suit the particular materials to be machined. The radiation sources for generating the electromagnetic radiation can likewise be selected within wide limits to suit the applicable requirements and the materials to be machined. Both radiation sources whose electromagnetic radiation has a single wavelength and radiation sources whose electromagnetic radiation has multiple wavelengths can be used. The wavelengths can also be selected such that a material absorbs electromagnetic radiation of a plurality of wavelengths.

An especially advantageous feature of the teaching of the invention provides that the first and the second wavelength are selected such that the electromagnetic radiation of the second wavelength is absorbed by the first material, while the electromagnetic radiation of the first wavelength is passed substantially completely through from the first material to the second material disposed downstream of the first material in the incident direction. In this embodiment, the electromagnetic radiation of the first wavelength is substantially not absorbed by the first material but instead is substantially passed completely through to the second material. In this way, an undesired absorption of the electromagnetic radiation of the first wavelength in the first material is substantially avoided. The electromagnetic radiation of the first wavelength is instead passed through to the second material, in which it is absorbed and acts in the desired way on that material.

In principle, it is possible for the electromagnetic radiation of the first wavelength and the electromagnetic radiation of the second wavelength to be generated by the same radiation source, such as a radiation source that generates electromagnetic radiation in a wavelength band that includes the first wavelength and the second wavelength. An advantageous embodiment, however, provides that the electromagnetic radiation of the first wavelength and the electromagnetic radiation of the second wavelength are generated by different radiation sources. In this embodiment, an adaptation of the various radiation sources to the various materials is made possible; for instance, the intensity of the electromagnetic radiation can be selected for the various materials separately from one another. Furthermore, the action time of the electromagnetic radiation or the type of action, such as continuous or pulsed operation, can be selected for the various materials separately from one another.

Another refinement provides that the electromagnetic radiation of the first wavelength and the electromagnetic radiation of the second wavelength are generated by radiation sources of different types of radiation. The electromagnetic radiation of the first wavelength and the electromagnetic radiation of the second wavelength can, however, also be generated by radiation sources of the same type of radiation, as another refinement provides. In the aforementioned embodiments, laser radiation and/or infrared radiation can for instance be employed as the types of radiation. In the embodiment having the radiation sources of different types of radiation, at least one of the radiation sources can for instance be formed a laser and at least one another radiation source can be formed an infrared radiator. In the embodiment with the radiation sources of the same type of radiation, lasers can for instance be used exclusively as the radiation sources.

The shape, size and geometry of the component or the component array to be machined can be selected within wide limits. One embodiment provides that the second material immediately follows the first material in the incident direction of the electromagnetic radiation. In this embodiment, the two materials are placed adjacent one another, so that they can for instance be welded to one another.

Another refinement provides that at least one third material, which is substantially permeable to the electromagnetic radiation of the first wavelength, is disposed between the first material and the second material. In this embodiment, the electromagnetic radiation of the first wavelength is passed through from the first material to the third material and from there to the second material, so that it acts substantially only on the second material.

The first material can in principle be disposed under the surface of the component, as long as the surface of the component comprises a material that is sufficiently permeable to the electromagnetic radiation of the first and second wavelengths. Expediently, however, the first material forms one surface of the component or the component array. In this embodiment, the electromagnetic radiation directly strikes the first material, and the electromagnetic radiation of the first wavelength is passed partly or completely through to the second material, and the electromagnetic radiation of the second wavelength is absorbed by the first material.

The intensity of the electromagnetic radiation can be selected to suit the applicable requirements, and in the case of different radiation sources can also be selected separately from one another for the radiation of the various wavelengths. An especially advantageous embodiment provides that as a function of the thickness of the first or second material in the incident direction of the electromagnetic radiation, the wavelength and intensity of the electromagnetic radiation are selected such that the electromagnetic radiation of the second wavelength is absorbed substantially completely by the first material and/or the electromagnetic radiation of the first wavelength is absorbed substantially completely by the second material. In this way, the electromagnetic radiation of the second wavelength for instance acts substantially exclusively on the first material, so that an undesired action on the second material or further materials that are disposed downstream of the first material in the incident direction is averted.

An extraordinarily advantageous refinement of the teaching of the invention is that the first material is a ceramic material; that the second material is a metal; and that the third material is a bonding material for bonding the ceramic material to the metal. It has been found that the teaching of the invention is extraordinarily well suited to the joining of components of ceramic material to components of metal.

A refinement of the aforementioned embodiment provides that the third material is a glass solder, which is preferably disposed between the ceramic material and metal or upon heating of the ceramic material and/or of the metal is introduced and in particular flows into the region between the ceramic material and the metal. In this embodiment, the method according to the invention is used to solder components of ceramic material to components of metal by means of a glass solder. By means of the method of the invention, the soldering is made simple and reliable, without the risk that the ceramic material will be damaged. Thus the method of the invention for the first provides a possibility of soldering components of ceramic material to components of metal simply and quickly and substantially independently of the component geometry.

A refinement of the teaching of the invention provides that the electromagnetic radiation of the first wavelength is generated by an Nd:YAG laser or a diode laser or an infrared radiator, and the electromagnetic radiation of the second wavelength is generated by a $CO_2$ laser. This refinement is advantageous particularly in those embodiments in which a component of ceramic material is soldered to a component of metal, since appropriate ceramic materials are substantially permeable to the radiation of an Nd:YAG laser, diode laser or infrared radiator, while they absorb the radiation of a $CO_2$ laser. Another embodiment provides that the component or the component array is embodied rotationally symmetrically, and that in the radial direction from the outside to the inside, the first material and the second material follow one another, and optionally at least one further material, such as the third material, is located between the first material and second material. In this embodiment, the electromagnetic radiation of the first wavelength is passed through from the radially outer layer of the component to a radially inner layer, while the laser radiation of the second wavelength is absorbed by the radially outer layer of the component, In this way, selective machining of rotationally symmetrical components is made possible.

Particularly in the joining of components, it can be sufficient to use electromagnetic radiation of a first wavelength and a second wavelength. If necessary, however, more than two wavelengths can also be used. To that end, one embodiment provides that electromagnetic radiation with three or more wavelengths is used, and that associated with the electromagnetic radiation of each wavelength is a material in the component or the component array which absorbs the electromagnetic radiation of that wavelength more strongly than the electromagnetic radiation of the other wavelengths, while the other materials absorb the electromagnetic radiation of that wavelength more weakly the material associated with that wavelength. In this embodiment, selective machining is made possible even for components or component arrays that comprise three or more materials.

An especially advantageous refinement of the aforementioned embodiment provides that the material associated with the electromagnetic radiation of a wavelength absorbs the electromagnetic radiation of that wavelength, while it is substantially permeable to the electromagnetic radiation of the other wavelengths. In this embodiment, the electromagnetic radiation of one wavelength associated with one material acts substantially exclusively on that material, so that an undesired action on the other materials is avoided.

Another embodiment provides that the electromagnetic radiation of the first wavelength has the electromagnetic radiation of the second wavelength and/or electromagnetic radiation of a further wavelength superimposed on it, in such a way that the electromagnetic radiation of the various wavelengths is aimed from the same direction onto the component or the component array. In this embodiment, the electromagnetic radiation of different wavelengths impinges in the same region on the component or the component array to be machined.

However, the electromagnetic radiation of various wavelengths can also be aimed at the component from various directions, as another embodiment provides.

In principle, it suffices if the various wavelengths are generated by the same radiation source, or if a separate radiation source is provided for each wavelength. A refinement, however, provides that for at least some of the various wavelengths, the electromagnetic radiation is generated by more than one radiation source, or the incident radiation is split into a plurality of split beams. In this embodiment, the electromagnetic radiation of one wavelength can for instance be aimed simultaneously from multiple directions at the component to be machined.

In another embodiment, beam forming means are disposed in the beam path of the incident electromagnetic radiation. This enables shaping of the incident radiation, such as focusing or the forming of a beam spot of a desired shape on the component.

During the machining, the component or the component array and the radiation source or sources can be in repose relative to one another. However, they can also be moved relative to one another during the machining, as another embodiment provides.

The method of the invention is suited in a versatile way for the machining of components or component arrays. An especially advantageous embodiment, however, provides that the component array has a first component, which comprises the first material, and a second component, which comprises the second material, and that the first component is joined to the second component. The method of the invention is especially well suited to such joining methods.

A refinement of the aforementioned embodiment provides that the first component and the second component follow one another directly in the incident direction of the electromagnetic radiation, and that the first component is welded or fused to the second component. In this exemplary embodiment, the electromagnetic radiation of the second wavelength acts on the first component, while the electromagnetic radiation of the first wavelength acts on the second component. Given a suitable choice of intensity and action time of the electromagnetic radiation, the components can be welded or fused to one another in this way.

Another embodiment provides that in the incident direction of the electromagnetic radiation, a solder is located between the first component and the second component, by means of which the first component is soldered to the second component. The solder can be substantially permeable to the electromagnetic radiation of the first wavelength, so that the electromagnetic radiation of the second wavelength heats the first component and the electromagnetic radiation of the first wavelength heats the second component, until the solder melts and the components are thus soldered together.

It is also an object of the invention to provide an apparatus for joining, in particular soldering, a component comprising a first material to a component comprising a second material.

The apparatus of the invention is based on the concept of using electromagnetic radiation with at least two wavelengths for the machining, which are selected such that the radiation of the one wavelength acts predominantly or exclusively on the first component, while the electromagnetic radiation of the other wavelength acts predominantly or exclusively on the second component. For this reason, the apparatus according to the invention is suitable for selective material machining of components and component arrays comprising different materials.

An especially advantageous refinement of the apparatus provides control means, which control the intensity of the electromagnetic radiation of the second wavelength as a function of the thickness of the first material in the incident direction in such a way that the electromagnetic radiation of the second wavelength is absorbed substantially completely by the first material. In this way, an undesired action of the electromagnetic radiation of the second wavelength on the other materials is reliably avoided.

BRIEF DESCRIPTION OF THE DRAWINGS

The invention will be described in further detail below in conjunction with the accompanying drawing.

Shown are.

DETAILED DESCRIPTION OF THE DRAWINGS

Figure 1:
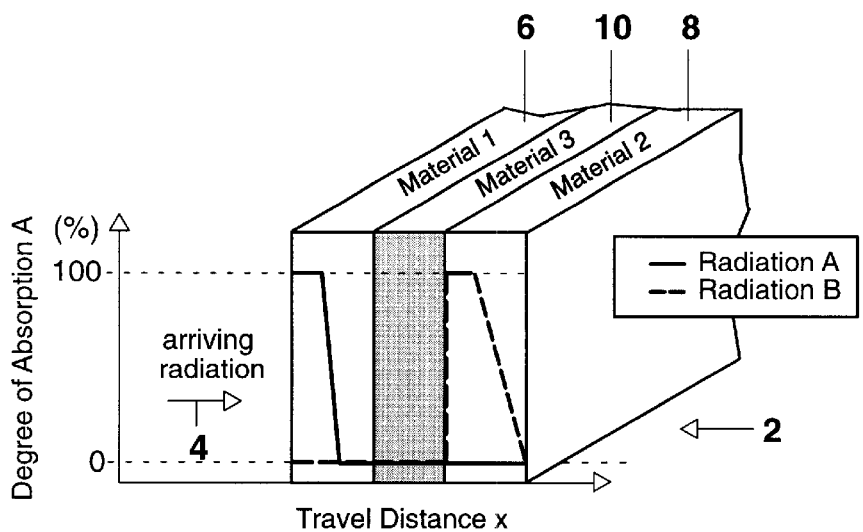
FIG. 1, a schematic illustration of a component array, comprising three components of different materials, which is joined using the method of the invention.

In the drawing figures, identical or equivalent elements are identified by the same reference numerals.

In FIG. 1, a component array is schematically shown that comprises three successive components 6, 8, 10 in layers one after the other in an incident direction, represented by an arrow 4 in FIG. 1, of electromagnetic radiation.

A first component 6 forms one surface of the component array 2 and comprises a first material, which in this exemplary embodiment is formed by a ceramic material. A second component 8 is disposed downstream of the first component 6 in the incident direction of the electromagnetic radiation and comprises a second material, which in this exemplary embodiment is formed by metal. Between the first component 6 and the second component 8 is a third component or a third material, which in this exemplary embodiment is formed by a glass solder 10. The electromagnetic radiation occurring in the incident direction 4 is formed in this exemplary embodiment by laser radiation of a first wavelength and laser radiation of a second wavelength; the laser radiation of the first wavelength is generated by an Nd:YAG laser, and the laser radiation of the second wavelength is generated by a $CO_2$ laser. The laser radiation of the first wavelength has the laser radiation of the second wavelength superimposed on it, so that the laser radiation of both wavelengths impinges on the component array 2 from the same direction. The ceramic material of the first component 6 and the glass solder 10 are substantially permeable to the laser radiation of the Nd:YAG laser, while the laser radiation of the $CO_2$ laser is absorbed by the ceramic material of the first component 6.

For soldering the first component 6 to the second component 8 by means of the glass solder 10, the method of the invention is performed as follows:

The laser radiation of the first wavelength generated by the Nd:YAG laser (indicated in FIG. 1 as radiation B) has the laser radiation of the second wavelength (represented as radiation A in FIG. 1) generated by the $CO_2$ laser superimposed on it by beam guide means, not shown, and impinges on the component array 2. Because of the permeability of the ceramic material of the first component 6 and of the glass solder 10 to the laser radiation of the first wavelength, this radiation is substantially passed entirely through to the second component 8 of metal, by which it is absorbed.

By comparison, the laser radiation of the second wavelength, generated by the $CO_2$ laser, is absorbed by the ceramic material of the first component 6. The intensities of the laser radiation of the first wavelength and the second wavelength are selected as a function of the thickness in the incident direction of the first component 6 and second component 8 such that the laser radiation of the second wavelength is absorbed substantially completely in the first component 6, and the laser radiation of the first wavelength is absorbed substantially completely in the second component 8.

The absorption of the laser radiation of the first wavelength leads to heating of the second component 8, and the absorption of the laser radiation of the second wavelength leads to heating of the first component 6, until the glass solder 10 melts. The laser radiation can then be switched off, so that the component array 2 cools down and the glass solder 10 as it cools down bonds the first component 6 to the second component 8, so that the first component 6 is soldered to the second component 8 in the desired way.

By means of the method of the invention, simple and fast soldering of the first component 6 to the second component 8 is made possible, without the occurrence of high temperature gradients that could lead to thermal stresses and thus to damage to the component array 2, in particular to the first component 6 of ceramic material.

In FIG. 1, a coordinate system is shown on the x axis of which the propagation path of the laser radiation in the component array 2 is plotted, and on the y axis of which the degree of absorption of the laser radiation is plotted as a function of the propagation path. It can be seen that the laser radiation of the second wavelength (radiation A) is completely absorbed by the first component, while conversely the laser radiation of the first wavelength (radiation B) is passed through completely from the first component 6 and the glass solder 10 to the second component 8, where it is completely absorbed.

Figure 2:
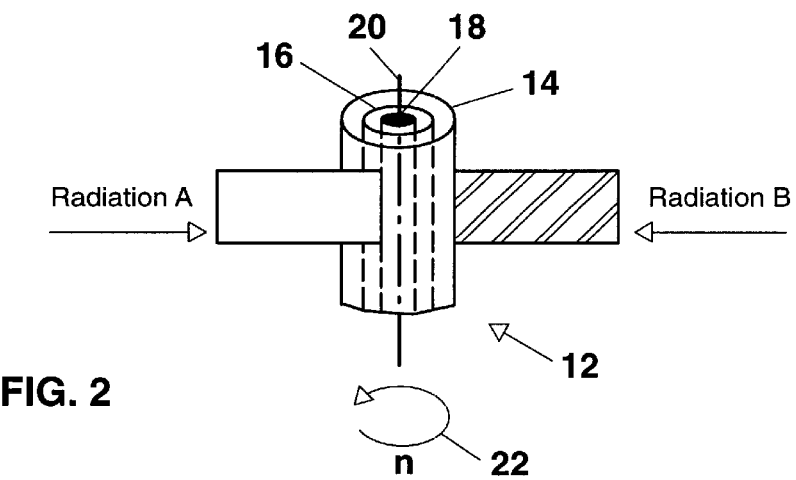
FIG. 2, a schematic illustration of a rotationally symmetrical component array, comprising three components of different materials, which is joined using the method of the invention.

In FIG. 2, a rotationally symmetrical component array 12 is shown, which has a radially outer layer 14 of ceramic material, over which a layer 16 of glass solder and a core 18 of metal follow, in the radial direction from the outside inward. The laser radiation of the first wavelength is generated, as in the exemplary embodiment of FIG. 1, by an Nd:YAG laser, and the laser radiation of the second wavelength is generated by a $CO_2$ laser. The laser radiation of the first wavelength (radiation B) and the laser radiation of the second wavelength (radiation A) impinge on the component array 12 at diametrically opposite points. To enable uniform machining of the component array 12 in the circumferential direction, the component array 12 is received on a mounting, not shown in FIG. 2, and is rotatable by means of a rotary drive, also not shown, about a pivot axis 20 symbolically represented by a dashed line in FIG. 2, the rotation being indicated in FIG. 2 by an arrow 22. In the machining, the laser radiation of the first wavelength is passed through from the radially outer layer 14 and the layer 16 of glass solder to the radially inner core 18, where it is completely absorbed. The laser radiation of the second wavelength is conversely absorbed completely by the radially outer layer 14. In this way, the radially outer layer 14 and the radially inner core 18 are heated, until the glass solder 16 melts, which solidifies after the laser radiation is shut off and in the desired way solders the radially outer layer 14 to the radially inner core 18.

Figure 3:
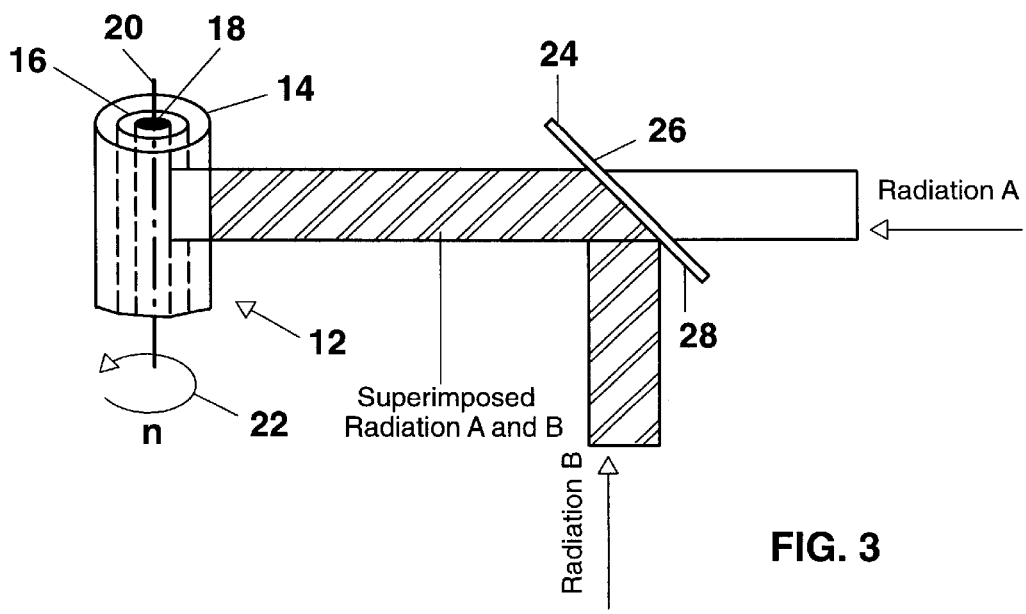
FIG. 3, in a schematic view, the component array of FIG. 2, in which the electromagnetic radiation of the first wavelength has the electromagnetic radiation of the second wavelength superimposed on it.

FIG. 3 shows the component array 12 of FIG. 2, in which the electromagnetic radiation of the second wavelength (radiation A) is superimposed on the electromagnetic radiation of the first wavelength (radiation B). To that end, beam guide means in the form of a mirror 24 are provided. The mirror 24 is disposed in the propagation path of the laser radiation of the second wavelength and is substantially permeable to the laser radiation of this wavelength, so that the laser radiation of the second wavelength aimed at a back side 26 of the mirror 24 is passed substantially through to the component array 12.

By comparison, the mirror 24 reflects the electromagnetic radiation of the first wavelength substantially completely, so that the laser radiation of the first wavelength aimed at a front side 28 of the mirror 24 is reflected onto the component array 12, with the laser radiation of the second wavelength being superimposed on the laser radiation of the first wavelength.

Figure 4:
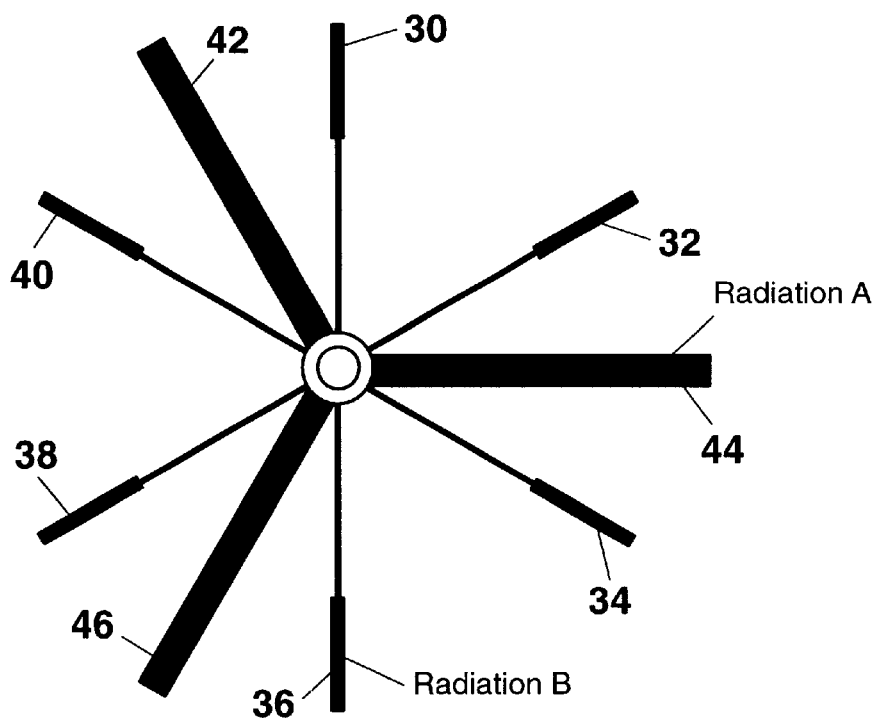
FIG. 4, a schematic plan view on an apparatus in which the electromagnetic radiation of the first wavelength and the electromagnetic radiation of the second wavelength are each generated by a plurality of radiation sources.

FIG. 4 schematically shows an arrangement in which the laser radiation of the first wavelength (radiation B) is generated by six Nd:YAG lasers 30–40, spaced equally apart from one another in the circumferential direction of the component array 12, while the electromagnetic radiation of the second wavelength (radiation A) is generated by three $CO_2$ lasers 42, 44, 46 spaced-equally apart from one another in the circumferential direction of the component array 12.

Figure 5:
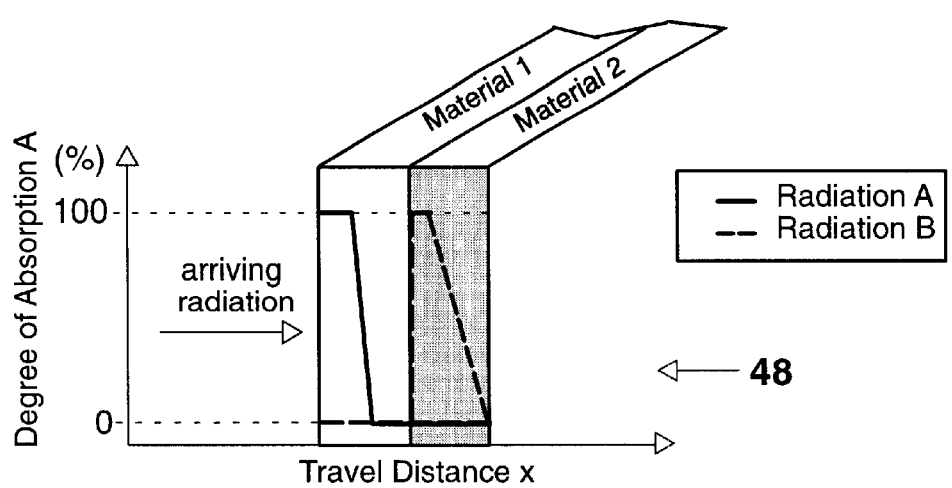
FIG. 5, in the same view as FIG. 1, a component array that comprises two components adjoining one another.

In FIG. 5, a further component array 48 is shown, which differs from the component array of FIG. 1 in that the first component 6 and the second component 8 succeed one another directly in the incident direction 4 of the laser radiation. In a way corresponding to FIG. 1, the laser radiation of the first wavelength (radiation B) is passed through from the first component 6 to the second component 8, where it is completely absorbed, while the laser radiation of the second wavelength (radiation A) is completely absorbed by the first component 6. In this way, the first component 6 and the second component 8 are heated and can be welded or fused to one another, for instance.

To generate electromagnetic radiation of the first wavelength, instead of the Nd:YAG laser an infrared radiator, which is less expensive than an Nd:YAG laser, can be used.

What is claimed is:

1. A method for machining a component or a component array by means of electromagnetic radiation, wherein the component or the component array comprises two materials disposed in succession in the incident direction of the electromagnetic radiation, wherein electromagnetic radiation of a first wavelength and laser radiation of at least one second wavelength is aimed at the component or the component array;

wherein the first and the second wavelength of the electromagnetic radiation are selected such that the electromagnetic radiation of the first wavelength is absorbed more weakly by a first material of the component or the component array than by a second material disposed downstream of the first material in the incident direction of the electromagnetic radiation, while the electromagnetic radiation of the second wavelength is absorbed more strongly by the first material than by the second material; and wherein the first and second wavelength are selected such that the electromagnetic radiation of the second wavelength is absorbed by the first material, while the electromagnetic radiation of the first wavelength is passed substantially entirely through from the first material to the second material disposed downstream of the first material in the incident direction.

2. The method of claim 1, characterized in that the component or the component array and the radiation source or sources are moved relative to one another during the machining.

3. The method of claim 1, characterized in that the electromagnetic radiation of the first wavelength and the electromagnetic radiation of the second wavelength are generated by different radiation sources.

4. The method of claim 3, characterized in that the electromagnetic radiation of the first wavelength and the electromagnetic radiation of the second wavelength are generated by radiation sources of a different type of radiation.

5. The method of claim 1, characterized in that the electromagnetic radiation of the first wavelength and the electromagnetic radiation of the second wavelength are generated by radiation sources of the same type of radiation.

6. The method of claim 4, characterized in that laser radiation and/or infrared radiation are used as the radiation types.

7. The method of one of claim 1, characterized in that the second material directly follows the first material in the incident direction of the electromagnetic radiation.

8. The method of one of claim 1, characterized in that in the incident direction between the first material and the second material, at least a third material is disposed, which is substantially permeable to the electromagnetic radiation of the first wavelength.

9. The method of claim 1, characterized in that the first material forms a surface of the component or the component array.

10. The method of claim 1, characterized in that as a function of the thickness of the first or second material in the incident direction of the electromagnetic radiation, the wavelength and intensity of the electromagnetic radiation are selected such that the electromagnetic radiation of the second wavelength is absorbed substantially completely by the first material and/or the electromagnetic radiation of the first wavelength is absorbed substantially completely by the second material.

11. The method of claim 1, characterized in that the first material is a ceramic material; that the second material is a metal; and that the third material is a bonding material for bonding the ceramic material to the metal.

12. The method of claim 11, characterized in that the third material is a glass solder, which is preferably disposed between the ceramic material and metal or upon heating of the ceramic material and/or of the metal is introduced and in particular flows into the region between the ceramic material and the metal.

13. The method of claim 1, characterized in that the electromagnetic radiation of the first wavelength is generated by an Nd:YAG laser or a diode laser or an infrared radiator, and the electromagnetic radiation of the second wavelength is generated by a $CO_2$ laser.

14. The method of claim 1, characterized in that the component or the component array is embodied rotationally symmetrically, and that in the radial direction from the outside to the inside, the first material and the second material follow one another, and optionally at least one further material, such as the third material, is located between the first material and second material.

15. The method of claim 1, characterized in that electromagnetic radiation with three or more wavelengths is used, and that associated with the electromagnetic radiation of each wavelength is a material in the component or the component array which absorbs the electromagnetic radiation of that wavelength more strongly than the electromagnetic radiation of the other wavelengths, while the other materials absorb the electromagnetic radiation of that wavelength more weakly than the material associated with that wavelength.

16. The method of claim 15, characterized in that the material associated with the electromagnetic radiation of a wavelength absorbs the electromagnetic radiation of that wavelength, while it is substantially permeable to the electromagnetic radiation of the other wavelengths.

17. The method of claim 1, characterized in that the electromagnetic radiation of the first wavelength has the electromagnetic radiation of the second wavelength and/or electromagnetic radiation of a further wavelength superimposed on it, in such a way that the electromagnetic radiation of the various wavelengths is aimed from the same direction onto the component or the component array.

18. The method of 1, characterized in that the electromagnetic radiation of various wavelengths is aimed at the component from various directions.

19. The method of claim 1, characterized in that for at least some of the various wavelengths, the electromagnetic radiation is generated by more than one radiation source, or the incident radiation is split into a plurality of split beams.

20. The method of claim 1, characterized in that beam forming means are disposed in the beam path of the incident electromagnetic radiation.

21. The method of claim 1, characterized in that the component array has a first component, which comprises the first material, and a second component, which comprises the second material, and that the first component is joined to the second component.

22. The method of claim 21, characterized in that the first component and the second component follow one another directly in the incident direction of the electromagnetic radiation, and that the first component is welded and fused to the second component.

23. The method of claim 21, characterized in that in the incident direction of the electromagnetic radiation, a solder is located between the first component and the second component, by means of which the first component is soldered to the second component.

24. An apparatus for joining, in particular soldering, a first component (6) including a first material to a second component (8) including a second material, by means of electromagnetic radiation, said apparatus comprising:

a mounting for holding the second component (8) downstream of the first component (6) in the incident direction of the electromagnetic radiation;

means for generating electromagnetic radiation of a first wavelength and electromagnetic radiation of a second wavelength, which means include at least one radiation source, preferably a separate radiation source for the electromagnetic radiation of each wavelength, wherein the electromagnetic radiation of the first wavelength is absorbed more weakly by the first component (6) than by the second component (8) disposed downstream of the first component (6) in the incident direction, and the electromagnetic radiation of the second wavelength is absorbed more strongly by the first component (6) than by the second component (8); and control means for controlling the intensity of the electromagnetic radiation of the second wavelength as a function of the thickness of the first material in the incident direction and/or the intensity of the electromagnetic radiation of the first wavelength as a function of the thickness of the second material in the incident direction in such a way that the electromagnetic radiation of the second wavelength is absorbed substantially completely by the first material, and the electromagnetic radiation of the first wavelength is absorbed substantially completely by the second material.

25. The apparatus of claim 24, characterized in that the radiation sources are selected such that the electromagnetic radiation of the second wavelength is absorbed by the first component (6), while the electromagnetic radiation of the first wavelength is passed substantially completely through to the second component (8).

26. The apparatus of claim 24, characterized in that at least one of the radiation sources is a laser (30–40; 42–46).

27. The apparatus of claim 24, characterized in that at least one of the radiation sources is an infrared radiator.

28. The apparatus of claim 26, characterized in that the first radiation source is an Nd:YAG laser (30–40), a diode laser or an infrared radiator, and that the second radiation source is a $CO_2$ laser (42–46).

29. The apparatus of claim 24, characterized in that the radiation sources in the mounting are rotatable relative to one another about a pivot axis (22) extending preferably perpendicular to the incident direction of the electromagnetic radiation.

30. The apparatus of claim 24, characterized in that beam guide means are disposed in the propagation path of the electromagnetic radiation.

31. The apparatus of claim 30, characterized in that the beam guide means superimpose the electromagnetic radiation of the second wavelength on the electromagnetic radiation of the first wavelength.

32. The apparatus of claim 31, characterized in that the beam guide means have a mirror (24), which is substantially permeable to the electromagnetic radiation of one of the wavelengths and substantially reflects the radiation of the other wavelength; that the electromagnetic radiation of the wavelength to which the mirror (24) is substantially permeable is aimed at the mirror (24) in such a way that it is passed through to the component or the component array (12); and that the electromagnetic radiation of the other wavelength is aimed at the mirror (24) in such a way that it is reflected onto the component or the component array (12).

* * * * *